Nov. 11, 1969  M. S. KIRCHER  3,477,939
BIPOLAR ELECTROLYTIC CELL
Filed March 7, 1967  2 Sheets-Sheet 1
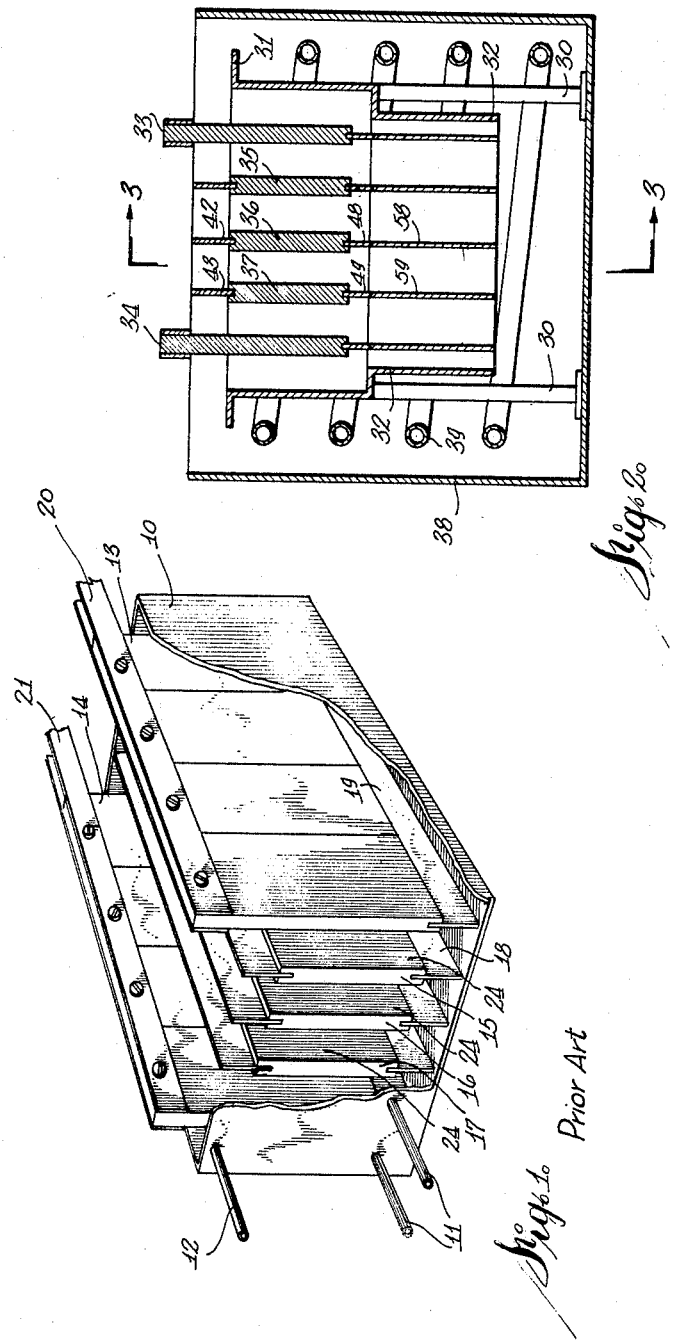
INVENTOR
Morton Sumner Kircher
BY
Weir, Marshall, MacRae & Lamb
PATENT AGENT Nov. 11, 1969                M. S. KIRCHER                 3,477,939
                        BIPOLAR ELECTROLYTIC CELL
Filed March 7, 1967                                    2 Sheets-Sheet 2
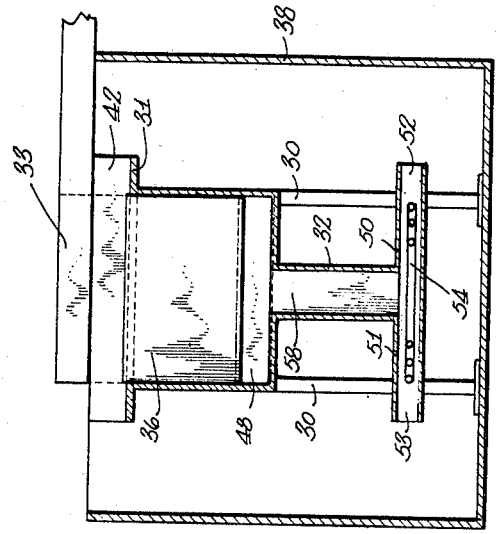
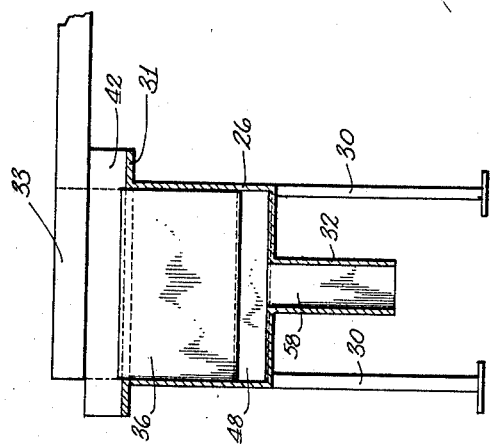
INVENTOR
Morton Sumner Kircher
BY
PATENT AGENT United States Patent Office
3,477,939
Patented Nov. 11, 1969

3,477,939
BIPOLAR ELECTROLYTIC CELL
Morton S. Kircher, Vancouver, British Columbia, Canada, assignor to Dryden Chemicals Limited, Dryden, Ontario, Canada
Filed Mar. 7, 1967, Ser. No. 621,198
Int. Cl. B01k 3/00
U.S. Cl. 204—268                                        4 Claims

ABSTRACT OF THE DISCLOSURE

A bipolar cell is divided into non-communicating compartments by means of the electrodes and upper and lower insulating separators. The upper separators form a series of overflow channels one on either side of each compartment electrically isolated from one another. The tank containing the electrodes has a downwardly directed draft box divided by separators into a corresponding number of compartments. The electrolyte circulation follows a path upwards through a draft box compartment and a corresponding compartment between the electrodes and thence outwards from the tank along the overflow channels. This arrangement reduces electrical leakage between adjacent compartments to a low value and, at the same time, provides a relatively unobstructed path for the natural circulation of electrolyte caused by the gas evolved during electrolysis.

Background of the invention

This invention relates to bipolar electrolytic cells and, in particular, to cells of this nature particularly adapted to the manufacture of sodium chlorate. The preferred method for the production of sodium chlorate is the electrolysis of sodium chloride solution. There are a number of intermediate reactions involved with the desired reaction being:

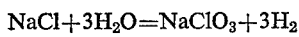
$$NaCl + 3H_2O = NaClO_3 + 3H_2$$

The rate of this overall reaction is dependent on many factors such as temperature and pH of the electrolyte, presence of catalysts and concentration of the reactants. It is known that the best conditions for completing the reaction and maintaining good current efficiency are obtained by providing a reaction tank as well as an electrolytic cell. The electrolyte is circulated between the reaction tank and electrolytic cell so as to provide maximum retention time in the reaction tank and minimum holding time in the electrolytic cell.

An additional requirement for the efficient performance of the overall reaction is the provision of some means for taking away the heat generated in the electrolysis. It is known to use cooling coils immersed in the reaction tank, however with a large reaction tank and hence a low rate of circulation a large area of heat exchange surface is required. Alternatively, it is known to use a pump to increase the circulation rate and give an increased value of heat exchange coefficient.

It is customary to use a battery of bipolar cells in the production of sodium chlorate since this type of cell results in compact apparatus and dispenses with exposed metallic connections and busbars leading to the intermediate electrodes. Such exposed parts may be liable to attack by evolved gas causing corrosion and subsequent contamination of the electrolyte. In a bipolar cell parallel electrodes are mounted in a battery box at spaced apart positions and sealed at their edges and, frequently, the bottom to prevent the leakage of electrolyte between adjacent cell compartments. Electrolyte is circulated through the compartments between the electrodes and electrical connections are made to the outer electrodes only. The inner electrodes assume voltages intermediate between the voltages of the outer electrodes and act as an anode on one surface and a cathode on the other.

In bipolar cells it is necessary to ensure that the leakage current between cells is limited to a low value, since such shunt-current losses reduce the current efficiency of the cell. Such leakage current generally limits the total voltage of a battery of cells to the order of 100 volts or less. As mentioned, isolation between adjacent cells is provided by sealing the sides of the electrodes to the box. Electrolyte enters each compartment from the reaction tank by inlet tubes positioned at the foot of the compartment and leaves through outlet tubes positioned at the top of the compartment. By making these tubes long and of small diameter the leakage current between adjacent compartments may be reduced to a small value.

This is not, however, an acceptable solution to the problem of reducing leakage current since the resistance to electrolyte flow in the tubes unduly restricts its circulation. As has been pointed out, a high rate of circulation is necessary both to give maximum retention time in the reaction tank and a satisfactory rate of heat exchange with the cooling coils. Natural circulation of the electrolyte is caused by the generation of hydrogen gas between the electrodes. This reduces the average specific gravity of the electrolyte and the mixture of gas and electrolyte is forced upwards by the more dense electrolyte in the reaction tank. In known apparatus using small diameter inlet and outlet tubes the foam caused by the mixture of gas and electrolyte hampers the already restricted circulation through the outlet tubes. Hitherto the only method known for overcoming this difficulty has been the use of a mechanical pump.

Summary

It will be seen that the requirement for efficient circulation of the electrolyte is in conflict with the requirement that the cell compartments should be isolated from one another and any design of such electrolytic cells must represent a resolution of these conflicting factors. In the bipolar cell of this invention the parallel electrodes are arranged in a tank or battery box which, in distinction to known types of electrode tanks, is open at both the top and bottom. Each electrode has a related upper insulating separator extending beyond the sides of the box and a lower insulating separator extending to the foot of the box. In a direction across the box, each of the electrodes and separators are of such length to abut against a pair of opposite sides and thus divide the box into a number of vertically extending, non-communicating compartments.

The portions of the upper separators extending beyond the sides of the box form a series of divided spillways or overflows which permit the discharge of the electrolyte while maintaining electrical isolation between the various compartments. Due to the reduced wall contact this open-top spillway operates at a much lower pressure head than that required by a tube discharge system and, in addition, enables the bubbles of gas to escape from the foaming electrolyte as it traverses the spillway thus reducing the amount of foam.

To ensure electrical isolation between the electrodes at the bottom of the box in a draft box is provided extending in a downward direction. The lower separators, or extensions of them, extend downwards into the draft box thus further defining the vertically extending non-communicating compartments. In contrast to prior art electrolytic cells this arrangement avoids the use of tubes at the inlet to the cell compartments and, because of reduced flow resistance, increases the circulation in the cell.

The increased circulation provided by the electrolytic cell of this invention makes it possible to obtain adequate cooling of the electrolyte by placing cooling coils in the path of the natural electrolyte circulation in the reaction tank. These cooling coils may be positioned either underneath the overflow from the spillways or in the draft box. The electrical isolation between adjacent compartments maintains the leakage current at less than 2% of the total current.

Brief description of the drawings

FIGURE 1 is a perspective view of a bipolar cell of the type known in the prior art, with a portion of the battery box cut away, FIGURE 2 is a side elevation, in cross-section, of the electrolytic cell of this invention positioned inside a reaction tank, FIGURE 3 is an end elevation, in cross-section, of the electrolytic cell shown in FIGURE 2, and FIGURE 4 is an end elevation, in cross-section, of a modified form of the electrolytic cell of this invention positioned inside a reaction tank.

Description of the preferred embodiments

A brief description will be given first of the type of bipolar cell known in the prior art. As shown in FIGURE 1 this cell consists of a battery box 10 closed at the bottom and open at the top. Enclosed in the battery box are parallel electrodes 13 and 14 separated by a number of parallel bipolar electrodes 15, 16 and 17. Electrical power is supplied to electrodes 13 and 14 by means of conductors 20 and 21. The electrodes abut against opposite walls of the battery box and have insulating separators such as shown at 18 and 19 extending from the bottom of the electrodes to the bottom of the battery box. The bipolar electrodes have additional upper insulating separators, such as shown at 22 and 23, extending approximately to the top of the battery box. The combined effect of the electrodes and upper and lower separators is to form a series of non-communicating cell compartments 24. The only electrical connection between adjoining compartments is through the bipolar electrode.

In the prior art cell of FIGURE 1 electrolyte circulation is obtained by providing a series of inlet pipes 11, at least one at the foot of each cell compartment and a series of outlet pipes 12, at least one at the top of each cell compartment. In operation, the battery box 10 is placed inside a reaction tank (not shown in FIGURE 1) containing electrolyte to a level approximately equal to that of outlet pipes 12. Due to the gas evolved during electrolysis the electrolyte in the battery box rises to a level higher than that of pipes 12 and electrolyte leaves the battery box through pipe 12 under the influence of the pressure head so produced. Current leakage between adjacent cell compartments can occur through tubes 11 and 12. To minimize this current leakage the tubes are made of small diameter (approx. ½") and long (approx. 6"). This narrow diameter restricts the flow of electrolyte. In the case of tubes 12, where gas bubbles are present in the electrolyte forming a foam, the flow is even more severely restricted. A cover and associated duct-work is placed over the reaction tank and battery box to collect the evolved gases.

Referring now to FIGURES 2 and 3 one embodiment of the electrolytic cell of this invention will be described. A battery box 26 is provided which differs from the previously described battery box 10 in having an outer flange 31 surrounding the open top and a draft box 32 extending downwardly from the bottom. Electrodes 33 and 34 are positioned in the battery box parallel to one another and separated by bipolar electrodes 35, 36 and 37. The bipolar electrodes have attached to them upper separators of insulating material such as are shown at 42 and 43. It will be noted that the upper portions of the bipolar electrodes are substantially level with the top of battery box 26 and the upper separators rest on the flange 31. Attached to the foot of the electrodes are lower separators of insulating material such as shown at 48 and 49. Draft box separators also of insulating material such as 58 and 59 are attached to the lower separators and extend downwards substantially to the foot of the draft box.

Each electrode and its corresponding lower separator extends between opposite walls of the battery box to abut against these walls forming vertically extending non-communicating compartments. The upper separators continue the partitioning between these compartments upwards and, in conjunction with the flange 31, form independent overflows or spillways for each compartment. The draft box separators extend to abut against opposite longitudinally extending walls of the draft box and continue the separation between the compartments to the bottom of the draft box.

It will be clear that the particular configuration of the insulating separators shown is not an essential feature of this invention and variations may be made, obvious to those skilled in the art. Thus, the bipolar electrodes need not extend to the top of the battery box and the upper separators will have a T configuration with the leg being the portion in the battery box and the bar being the portion forming the overflow spillway. Instead of the lower separators and draft box separators being formed in separate sections, such as 48 and 58 they may be formed as a unit, also of T shape. In such a case the lower separator will extend to the foot of the draft box. In the claims appended hereto the term "lower separator" is used in such a sense.

Battery box 26 is placed in a reaction tank 38 and positioned by suitable supporting structures such as legs 30. Cooling coils 39 are positioned in the path of the overflow to cool the electrolyte in the reaction tank.

An alternative embodiment of this invention is shown in FIGURE 4. This embodiment is similar to that previously described with the exception that the inlet provided by draft box 32 is extended sideways in both directions by sections 50 and 51, thus forming extended entry ports 52 and 53. A cooling coil is provided in entry ports 52 and 53. The remaining portions of the electrolytic cell of FIGURE 4 are identical to those of the structure previously described with respect to FIGURES 2 and 3.

Thus there has been described an electrolytic cell which provides relatively free circulation of the electrolyte and, at the same time, maintains a high degree of isolation between the individual electrode compartments. The open spillway which contributes to these advantages permits the gas bubbles to escape from the electrolyte during the discharge flow thus requiring a smaller fluid head across the discharge channel than previously known designs using discharge tubes. Any conventional means may be used to collect the evolved gas, such as a cover and associated duct-work over reaction tank 38.

I claim:

1. An electrolytic cell for the production of sodium chlorate comprising:

a battery box having substantially vertical sides and an open top;

a draft box positioned below and communicating with said battery box, said draft box being open at the bottom;

a plurality of spaced parallel vertically positioned electrodes in said battery box;

a corresponding plurality of upper separators positioned in contact with the upper edges of said electrodes and lower separators positioned in contact with the lower edges of said electrodes and extending downwards into said draft box;

said upper and lower separators together with said electrodes dividing the battery box and draft box into vertically extending non-communicating compartments;

said upper separators extending beyond the sides of said battery box to provide a plurality of independent spillways, at least one for each compartment.

2. An electrolytic cell as defined in claim 1 wherein the opening at the foot of said draft box communicates with a horizontally extending channel having cooling coils therein.

3. An electrolytic cell as defined in claim 1 wherein an outwardly extending flange surrounds the top of said battery box and cooperates with said upper separators to form said plurality of independent spillways.

4. In combination:
an electrolytic cell as defined in claim 1, and
a reaction tank having cooling coils,
said cooling coils being situated in the path of electrolyte overflowing said spillways.

References Cited

UNITED STATES PATENTS

| 1,492,121 | 4/1924 | Cruser et al. | 204—297 |
| 3,385,779 | 5/1968 | Nishiba et al. | 204—237 XR |
| 3,405,051 | 10/1968 | Crane | 204—269 |

FOREIGN PATENTS 957,937  2/1957  Germany.

JOHN H. MACK, Primary Examiner

D. R. JORDAN, Assistant Examiner

U.S. Cl. X.R.

204—237, 275, 286